Jan. 20, 1931.  C. J. KOTCHI  1,789,656
ROD FOR WELDING
Filed Aug. 17, 1928
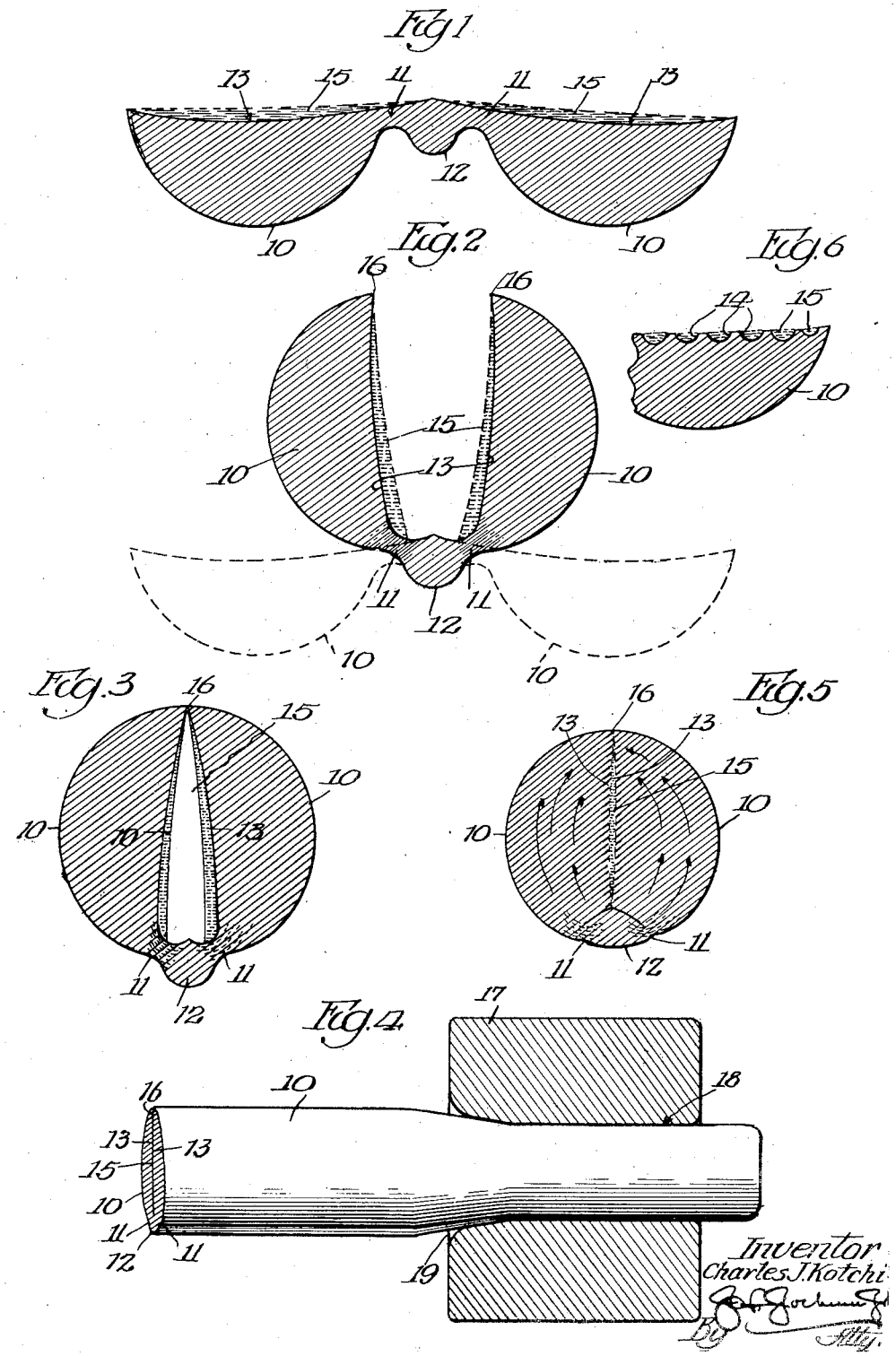
Inventor
Charles J. Kotchi Patented Jan. 20, 1931

1,789,656

UNITED STATES PATENT OFFICE

CHARLES J. KOTCHI, OF CHICAGO, ILLINOIS, ASSIGNOR TO KORO CORPORATION, OF WAUKEGAN, ILLINOIS, A CORPORATION OF ILLINOIS

ROD FOR WELDING

Application filed August 17, 1928. Serial No. 300,219.

This invention relates to improvements in rods for welding, brazing or the like, and one of the objects of the invention is to provide an improved rod of this character which is constructed or composed of all of the material necessary to produce, when in use, the necessary metal or alloy requisite for the desired result, so as to produce when fused, a deposit having characteristics similar to that upon which the deposit is made.

The rod consists of a body formed of bronze, aluminum, copper, or any other metal, and especially metal where flux coating will not hold on the outside of the rod, the flux being encased or housed within the body of the rod.

The invention consists further in providing a rod in a flat form and then after the same is provided on its face with a supply of flux, is bent or shaped into form to enclose the flux, a portion of the rod at one end of the joined surfaces being preferably shaped to form a protuberance which is forced between the adjacent surfaces to cause the metal strain to be exerted in such a way that the opposite edges of the rod will be forced together, thereby providing a locking means for the separated parts.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a transverse sectional view, on an enlarged scale, of a flat rod prepared in accordance with the principles of this invention and having fluxing material coating the upper surface thereof.

Figure 2 is a view similar to Figure 1 showing the first step in the operation of bending or shaping the rod.

Figure 3 is a sectional view of the rod after it has been completely bent into shape.

Figure 4 is a view showing the next step in the operation of completing the formation of the rod after it has been shaped as shown in Figure 3.

Figure 5 is a sectional view of the completed rod.

Figure 6 is a detail sectional view of a portion of the rod showing another method of holding the flux to the face of the rod.

In producing the rod a substantially flat body portion formed of any suitable material is provided, one face of which is shaped to form two convexed portions 10 which are laterally spaced from each other to provide reduced portions 11 intermediate the convexed portions. Intermediate these reduced portions and on the same face of the body is formed a protuberance 12 which may be of any desired configuration and of any desired size.

The opposite faces of the convexed portions 10 may, if desired, be concaved as shown at 13 in Figure 1, or may be substantially flat and shaped to form recesses or grooves 14, as shown in Figure 6, either extending throughout the respective surfaces or at predetermined intervals.

Any suitable fluxing material 15 may be applied to the faces 13 of the portions 10 of the body, or if the face is shaped as shown in Figure 6, the fluxing material may be placed within the recesses 14 so as to maintain the fluxing material against displacement with respect to the body portion of the rod.

The body portion is then bent upon medial lines extending lengthwise of the rod and in a direction substantially parallel with the longitudinal axis of the rod, so as to cause the faces 13 of the convexed portions 10 to be positioned adjacent each other as shown in Figures 2 and 3. The rod is thus bent until the longitudinal edges 16 of the portions 10 opposite to the reduced portions 11 are brought into close proximity to each other, preferably so that they will abut. This operation will encase or enclose the fluxing material 15 entirely within the body portion of the rod and when so bent the protuberance 12 will project beyond the periphery of the rod at a point opposite to the point where the edges 16 abut.

After the rod has thus been bent or shaped, the protuberance 12 is forced into the space between the faces 13 of the portions 10 and any suitable means may be provided for thus forcing the protuberance 12 into this position.

A suitable and efficient means for effecting this result embodies a die 17 having an opening 18 therethrough and which opening is of a size to produce the desired diameter of the rod by an extruding operation so that when the rod passes through the die it will be of the desired diameter. The opening 18 in the die is preferably provided with an enlarged entrance 19.

As the protuberance 12 is forced between the adjacent faces 13 and the portions 10 of the rod, the metal of the rod will be caused to exert a strain in the body of the rod in direction to cause the opposite edges 16 of the rod to be forced tightly together, thereby providing a locking means for the separated portion of the rod, as shown in Figure 5.

With this improved construction the flux 15 will be completely housed or encased within the body of the rod. In the event that a greater supply of flux 15 is supplied to the surfaces 13 of the rod when the rod is in its flat form, than is necessary in the final production of the rod, the excess amount of flux will be forced out of the rod during the extruding process, caused by the drawing of the rod through the die 17.

The reduced portions 11 on the opposite sides of the protuberance 12 facilitate in the shaping and bending of the rod and also in the forcing of the protuberance 12 between the proximate portions of the faces 13.

After the rod has been thus formed, it will have the appearance of a solid rod as the edges 16 thereof will be tightly held against each other. At the same time the flux 15 will not have any tendency to separate the edges 16, due to the fact that the strain of the material caused by the forcing of the protuberance into the space between the portions 10 at one edge thereof will have the effect of overcoming any tendency of the edges 16 to separate.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A welding rod blank embodying a body portion provided with a protuberance spaced from the lateral edges thereof, said body being reduced in cross section on opposite sides of said protuberance whereby the body may be bent upon itself on opposite sides of the protuberance to cause the outer lateral edges of the body to abut, the said protuberance being adapted to be forced between the adjacent folded faces of the body to maintain the abutting edges against separation.

2. A welding rod blank embodying a body portion, portions of said body adjacent the transverse center thereof being reduced in thickness whereby said body may be folded upon itself to cause the outer lateral edges thereof to abut, a portion of said body adjacent the said reduced portion being adapted to be forced between the adjacent faces of said folded portions to cause said lateral edges to abut and to be maintained against separation.

3. A welding rod blank embodying a body portion, portions of said body adjacent the transverse center thereof being reduced in thickness whereby said body may be folded upon itself to cause the outer lateral edges thereof to abut, a portion of said body adjacent the said reduced portion being adapted to be forced between the adjacent faces of said folded portions to cause said lateral edges to abut and to be maintained against separation, and flux material disposed between said faces and encased within the body of the completed rod.

4. A welding rod formed of a hollow body portion open along one longitudinal edge, fluxing material within said body, and means for creating a strain in said body from a point opposite the said opening for maintaining the edges of said opening in abutting relation.

5. A welding rod formed of a hollow body portion open along one longitudinal edge, fluxing material within said body, and means for creating a strain in said body from a point opposite the said opening for maintaining the edges of said opening in abutting relation, portions of said body on the opposite side of a line disposed opposite to said opening being reduced in thickness to facilitate shaping the rod.

6. A welding rod embodying a body split longitudinally thereof, flux material within the opening formed by said split, and means for causing inherent strain to be created in the rod to hold the edges of the split portion against separation.

7. A welding rod embodying a body split longitudinally thereof, flux material within the opening formed by said split, and means for causing inherent strain to be created in the rod and transverse to the length thereof to hold the edges of the split portion against separation.

8. The method of forming welding rods which consists in providing a body portion split lengthwise thereof, then placing flux within the split portion, and then forcing a portion of the body opposite to the split portion between the proximate faces of said split portion to create an internal stress in the material to hold the edges of said split portion against separation.

9. The method of forming welding rods which consists in providing a body portion split lengthwise thereof, then placing flux within the split portion, and then forcing by an extruding action a portion of the body opposite to the split portion between the proximate faces of said split portion to create an internal stress in the material to hold the edges of said split portion against separation.

10. The method of manufacturing welding rods which consists in forming on a substantially flat body portion a protuberance, then bending the body upon itself on opposite sides of said protuberance until the outer lateral edges of the body are brought into proximity, and then forcing said protuberance between said faces to hold said edges against separation.

11. The method of manufacturing welding rods which consists in forming on a substantially flat body portion a protuberance and reducing the body in thickness on opposite sides of said protuberance, then bending the body upon itself on opposite sides of said protuberance until the outer lateral edges of the body are brought into proximity, and then forcing said protuberance between said faces to hold said edges against separation.

12. A welding rod comprising a longitudinally split body, and means for causing inherent strain to be created in the rod to hold the edges of the split portion against separation.

13. A welding rod comprising a longitudinally split body, and means for holding the outer edges of the split portions in intimate contact and against separation by inherent pressure exerted thereon from a point of the rod opposite to said edges.

14. A welding rod comprising a longitudinally split body, the edges of the body disposed in close proximity, and forcing means opposite to said edges for maintaining them in intimate contact and against separation.

15. The method of producing a welding rod which consists in providing a body of a substantial width, then bringing the lateral edges of the body together to form an opening in the body of the rod, then forcing into the opening a portion of the said body opposite to said edges to maintain the latter in close proximity and against separation by the inherent strain created thereby.

16. The method of producing a welding rod which consists in providing a body of a substantial width, then bringing the lateral edges of the body together to form an opening in the body of the rod, then compressing a portion of the said body opposite to said edges to maintain the latter in close proximity and against separation by the inherent strain created thereby.

In testimony whereof I have signed my name to this specification on this 10th day of August, A. D. 1928.

CHARLES J. KOTCHI.